US011559114B2

(12) United States Patent
Takekawa et al.

(10) Patent No.: US 11,559,114 B2
(45) Date of Patent: Jan. 24, 2023

(54) MOLDED SURFACE FASTENER AND MANUFACTURING METHOD OF MOLDED SURFACE FASTENER

(71) Applicant: YKK Corporation, Tokyo (JP)

(72) Inventors: Makoto Takekawa, Toyama (JP); Yoshiyuki Fukuhara, Toyama (JP); Hiroyuki Yamashita, Toyama (JP); Kyoichi Yuki, Toyama (JP)

(73) Assignee: YKK Corporation, Tokyo (JP)

( * ) Notice: Subject to any disclaimer, the term of this patent is extended or adjusted under 35 U.S.C. 154(b) by 308 days.

(21) Appl. No.: 16/828,460

(22) Filed: Mar. 24, 2020

(65) Prior Publication Data

US 2020/0305558 A1 Oct. 1, 2020

(30) Foreign Application Priority Data

Mar. 29, 2019 (JP) .............................. JP2019-067415

(51) Int. Cl.
*A44B 18/00* (2006.01)
*B29C 43/22* (2006.01)
(Continued)

(52) U.S. Cl.
CPC ...... *A44B 18/0049* (2013.01); *A44B 18/0007* (2013.01); *A44B 18/0069* (2013.01);
(Continued)

(58) Field of Classification Search
CPC . Y10T 24/27; A44B 18/0046; A44B 18/0049; A44B 18/0069; A44B 18/0007;
(Continued)

(56) References Cited

U.S. PATENT DOCUMENTS 6,076,238 A * 6/2000 Arsenault ................. F16B 5/07
24/442
6,197,076 B1 * 3/2001 Braunschweig ....... B24D 11/02
451/538
(Continued)

FOREIGN PATENT DOCUMENTS

CN 104363785 A 2/2015
CN 108430251 A 8/2018
(Continued)

OTHER PUBLICATIONS

Office Action, Taiwanese Patent Application No. 109101120, dated Jul. 30, 2021, 11 pages.
(Continued)

*Primary Examiner* — Robert Sandy
*Assistant Examiner* — Michael S Lee
(74) *Attorney, Agent, or Firm* — Kilpatrick Townsend & Stockton LLP

(57) ABSTRACT

Provided is a molded surface fastener capable of stably having high engaging strength with respect to a loop member. The molded surface fastener of the present invention includes a base portion and a plurality of engaging elements provided with a stem portion and an engaging portion, and is formed of synthetic resin containing lubricant at 0.15 wt % or more and 1.00 wt % or less. A top end surface of the engaging element is formed to be flat, and the engaging portion has a hanging portion which hangs down obliquely downward toward the base portion.

13 Claims, 6 Drawing Sheets

(51) Int. Cl.
*B29C 69/02* (2006.01)
*B29C 43/46* (2006.01)
*B29L 31/00* (2006.01)

(52) U.S. Cl.
CPC ........ *A44B 18/0076* (2013.01); *B29C 43/222* (2013.01); *B29C 69/02* (2013.01); *A44B 18/0019* (2013.01); *A44B 18/0065* (2013.01); *B29C 43/46* (2013.01); *B29L 2031/727* (2013.01)

(58) Field of Classification Search
CPC ............ A44B 18/0076; A44B 18/0019; A44B 18/0065; B29L 2031/727; B29C 43/222; B29C 69/02; B29C 43/46

See application file for complete search history.

(56) References Cited

U.S. PATENT DOCUMENTS

| | | |
|---|---|---|
| 2013/0180088 A1 | 7/2013 | Takani et al. |
| 2015/0201718 A1 | 7/2015 | Fujii et al. |
| 2017/0231330 A1* | 8/2017 | Uchida ................ B32B 5/26 24/451 |
| 2018/0368534 A1 | 12/2018 | Fukuhara et al. |
| 2019/0008239 A1* | 1/2019 | Fukuhara ............ B29C 48/0011 |

FOREIGN PATENT DOCUMENTS

| | | |
|---|---|---|
| TW | 201216888 A1 | 5/2012 |
| WO | 2017/109902 A1 | 6/2017 |

OTHER PUBLICATIONS

Office Action, Chinese Patent Application No. 202010230212.4, dated Jun. 29, 2022, 12 pages.

* cited by examiner

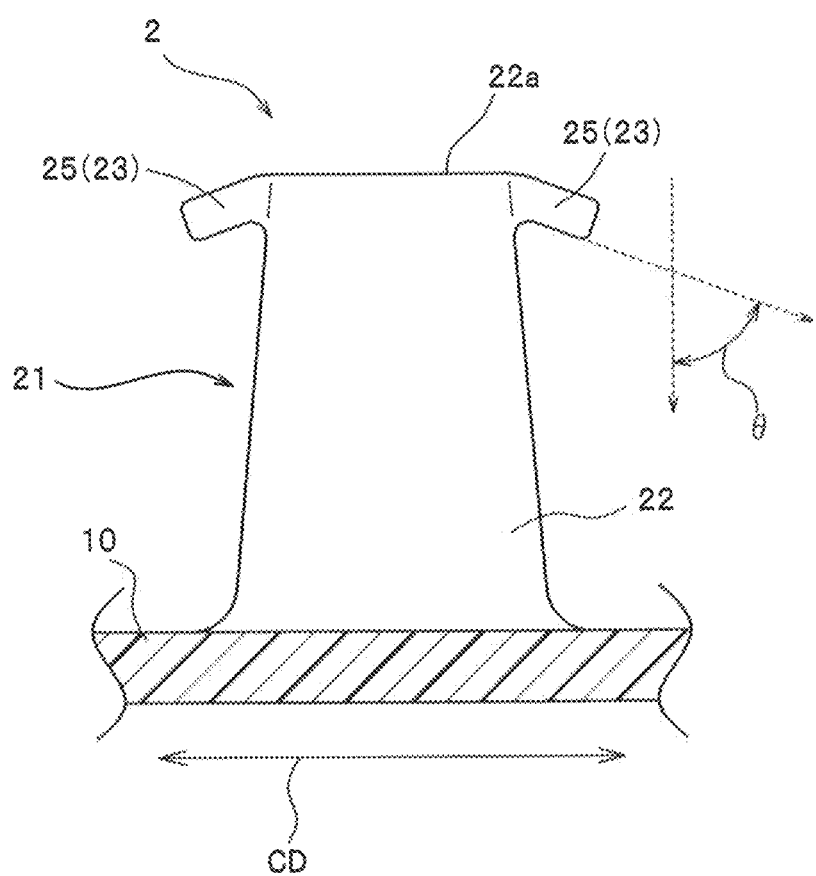

MOLDED SURFACE FASTENER AND MANUFACTURING METHOD OF MOLDED SURFACE FASTENER

TECHNICAL FIELD

The present invention relates to a molded surface fastener in which a plurality of engaging elements stand on a base portion and a manufacturing method for manufacturing the molded surface fastener.

BACKGROUND ART

Conventionally, surface fastener products in which a female surface fastener having a plurality of loops (hereinafter, referred to as a loop member) and a male molded surface fastener which is attachable and detachable with respect to the loop member are used in combination as a pair are known. In the male molded surface fastener, a plurality of engaging elements having a hook shape or a mushroom shape or the like, for example, stand on an upper surface of the plate-shaped base portion.

The surface fastener products having such a male molded surface fastener are now broadly used in a wide variety of goods, and often used for goods wearable to human bodies including disposable diapers, infant diaper covers, supporters for protecting joints in limbs, waist corset (lumbago belt), and gloves, for example.

A large number of molded surface fasteners used for disposable diapers and the like have been developed so far; and an example thereof is disclosed in, for example, International Publication No. 2017/10990 (Patent Document 1).

The molded surface fastener described in Patent Document 1 has a thin plate-shaped base portion and a plurality of engaging elements standing on an upper surface of the base portion. Each engaging element has a stem portion standing on the base portion and a disc-shaped engaging head portion formed integrally with an upper end part of the stem portion. The engaging head portion is provided with a plurality of micro pawl portions protruded from an outer peripheral edge part of the engaging head portion. Each pawl portion is formed to be sloped or curved downward toward the base portion of the molded surface fastener.

According to the molded surface fastener provided with the plurality of engaging elements having such pawl portions, loops of the loop member can be easily hooked on each engaging element, and the hooked loop can be less likely to be disengaged from the engaging element. Thereby, engaging strength (peeling strength) of the molded surface fastener with respect to the loop member can be effectively enhanced. Therefore, in a case that the molded surface fastener of Patent Document 1 is used for a product such as a disposable diaper, even when various movements are done in a state that the molded surface fastener and the loop member are combined, the combined state can be stably maintained.

Further, in Patent Document 1, since the pawl portion contributing to the increase in the engaging strength is formed in a micro size at the outer peripheral edge part of the engaging head portion, touch comfort of the molded surface fastener can be less likely to be affected by the pawl portion.

As a result, it becomes possible to provide a surface fastener having high engaging strength as well as good surface feel.

PRIOR ART DOCUMENTS

Patent Documents

Patent Document 1: WO 2017/109902 A1

SUMMARY OF INVENTION

Problems to be Solved by the Invention

In a case of manufacturing the molded surface fastener of Patent Document 1 as above, at first, a primary molded body having a thin plate-shaped base portion and a plurality of provisional elements (primary elements) standing on the base portion is molded by extruding molten thermoplastic resin continuously on an outer peripheral surface part of a rotating die wheel as a primary molding step. In this case, the provisional element has a primary stem portion standing on the base portion, a rib portion bulging from an upper surface of the primary stem portion, and protruded portions protruded to an outside of the primary stem portion from side edge parts of the rib portion.

Subsequently, the primary molded body having the plurality of provisional elements is conveyed toward a heat press apparatus for conducting a secondary molding step, and is introduced between an upper and lower pair of rollers of the heat press apparatus. In the secondary molding step, the primary molded body passes between the pair of upper and lower rollers, and the provisional element is deformed by pressing an upper end part of the provisional element from above by the upper side roller to mold an engaging element having the pawl portion which is sloped or curved downward as described above.

In Patent Document 1, however, even when the molded surface fastener is manufactured by conducting the above-mentioned primary molding step and the secondary molding step, the pawl portion of the engaging element may not have been formed to be appropriately sloped or curved downward, but have been formed to be protruded substantially in parallel with the base portion, for example. When the pawl portion is protruded substantially in parallel with the base portion in this manner, the effect of preventing the loops from coming off from the engaging element as described above may be weakened.

The present invention has been made in view of the above-described conventional problems, and a specific object is to provide a molded surface fastener capable of stably having high engaging strength (peeling strength) with respect to a loop member and a manufacturing method capable of stably manufacturing such a molded surface fastener.

Means for Solving the Problems

In order to achieve the above object, a molded surface fastener provided by the present invention, as a basic structure, is a molded surface fastener made of synthetic resin including a base portion and a plurality of engaging elements standing on the base portion, in which each of the engaging elements has a stem portion standing on the base portion and an engaging portion which is formed integrally with an upper end part of the stem portion and includes a part extending to an outside of an upper end part outer peripheral edge of the stem portion in a plan view of the engaging element, and in which the synthetic resin contains lubricant at 0.15 wt % or more and 1.00 wt % or less, a top end surface of the engaging element is formed to be flat, and the engaging portion has a hanging portion which hangs down obliquely downward toward the base portion.

In the molded surface fastener of the present invention, it is preferable that the engaging portion includes an engaging portion main body having a shape to extend outward from the entire upper end part outer peripheral edge of the stem portion and at least one pawl portion protruded from an outer peripheral edge part of the engaging portion main body, a top end surface of the engaging portion main body is formed to be flat as the top end surface of the engaging element, and the hanging portion is provided on at least a part of the pawl portion.

It is also possible that the engaging portion includes at least one pawl portion protruded from an outer peripheral side surface of the stem portion, a top end surface of the stem portion is formed to be flat as the top end surface of the engaging element, and the hanging portion is provided on at least a part of the pawl portion.

In the molded surface fastener of the present invention as mentioned above, it is preferable that the lubricant is fatty acid amide lubricant.

It is preferable that the main component of the synthetic resin is polypropylene.

Further, it is preferable that an inclination angle at which the hanging portion hangs down with respect to a height direction of the stem portion is 20° or larger and 80° or smaller.

Next, a manufacturing method of a molded surface fastener provided by the present invention is a manufacturing method of a molded surface fastener made of synthetic resin and including a base portion and a plurality of engaging elements standing on the base portion, in which each of the engaging elements has a stem portion standing on the base portion and an engaging portion which is formed integrally with an upper end part of the stem portion and includes a part to extend to an outside of an upper end part outer peripheral edge of the stem portion in a plan view of the engaging element, the method including a preliminary step of preparing a composition that lubricant at 0.15 wt % or more and 1.00 wt % or less is added to thermoplastic resin, a primary molding step of melting the composition and molding a primary molded body having the base portion and a plurality of primary elements standing on the base portion, and a secondary molding step of molding the molded surface fastener in which a top end surface of the engaging element is formed to be flat and the engaging portion has a hanging portion which hangs down obliquely downward toward the base portion by contacting a secondary molding roller with an upper end part of the primary element molded in the primary molding step, as a main characteristic.

Effects of the Invention

In the present invention, the synthetic resin forming the molded surface fastener contains lubricant at 0.15 wt % or more and 1.00 wt % or less. For example, a primary molding step of molding a primary molded body having a plurality of primary elements (provisional elements) is conducted using the synthetic resin containing lubricant as above. Subsequently, a secondary molding step of pressing an upper end part of the primary element with a secondary molding roller with respect to the obtained primary molded body is conducted. Thereby, a top end surface of the engaging element can be formed to be flat and to be in parrarel with a first surface (upper surface) of the base portion. Furthermore, in the secondary molding step, frictional resistance between the primary molded body and the secondary molding roller can be reduced, therefore, a hanging portion which hangs obliquely downward toward the base portion can be easily formed on at least a part of the engaging portion provided in the engaging element.

Therefore, in the molded surface fastener of the present invention manufactured by conducting the secondary molding step, the top end surface of each engaging element is flat, and therefore the first surface (upper surface) on which the engaging elements of the molded surface fastener are provided can obtain good touch. Further, since the engaging portion of the engaging element is provided with the hanging portion as above, when engaging a loop member with the molded surface fastener, the loop member can be less likely to come off from the engaging element by hooking the loops of the loop member on the hanging portion of the engaging element. Therefore, the molded surface fastener of the present invention can have high engaging strength (peeling strength) with respect to the loop member.

In such a molded surface fastener of the present invention, the engaging portion has an engaging portion main body extending outward entirely from an upper end part outer peripheral edge of a stem portion in a plan view of the engaging element, and at least one pawl portion protruded from an outer peripheral edge part of the engaging portion main body. In this case, a top end surface of the engaging portion main body is formed to be flat, and the hanging portion is provided in at least a part of the pawl portion. Since the engaging element has such a form, the molded surface fastener of the present invention can stably have both good touch and high engaging strength as described above.

The molded surface fastener of the present invention may be formed such that the engaging portion has at least one pawl portion protruded from the outer peripheral side surface of the stem portion, a top end surface of the stem portion is formed to be flat, and the hanging portion is provided in at least a part of the pawl portion. Such a molded surface fastener of the present invention can also stably have both good touch and high engaging strength.

In the present invention, the lubricant to be contained in the synthetic resin is fatty acid amide lubricant, and preferably at least one kind which is selected from a group of stearamide, oleamide, erucamide, methylenebis stearamide, and ethylenebis stearamide. Since the fatty acid amide lubricant as above is added to the synthetic resin, when pressing the primary molded body with the secondary molding roller in the above-described secondary molding step, frictional resistance between the primary molded body and the secondary molding roller can be effectively reduced. Therefore, the engaging portion of each engaging element can stably have the above-mentioned hanging portion.

Polypropylene is used as a main component of the synthetic resin to form the molded surface fastener. The main component here means a component having the highest ratio in the entire molded surface fastener. Particularly in the present invention, it is preferable that 90 wt % or more, preferably 95 wt % or more of the material to form the molded surface fastener is polypropylene. Thereby, the engaging element of the molded surface fastener can stably have the flat top end surface and the hanging portion provided in the engaging portion.

In the present invention, an inclination angle at which the hanging portion of the engaging portion hangs down with respect to a height direction of the stem portion is 20° or larger and 80° or smaller. Thereby, engaging strength of the molded surface fastener with respect to the loop member can be increased effectively.

Next, in a manufacturing method of the molded surface fastener according to the present invention, a preliminary step of preparing a composition that lubricant of 0.15 wt % or more and 1.00 wt % or less is added to a thermoplastic resin, a primary molding step of melting the composition and molding a primary molded body having a base portion and a plurality of primary elements, and a secondary molding step of molding a molded surface fastener by contacting a secondary molding roller with an upper end part of the molded primary element are conducted.

In this case, in the primary molding step, the composition containing lubricant is poured toward a rotating die wheel to mold the primary molded body in which the primary element has a primary stem portion standing on the base portion, a rib portion bulging from an upper surface of the primary stem portion, and a protruded portion protruded to an outside of the primary stem portion from the rib portion.

Subsequently, the secondary molding step is conducted with respect to the obtained primary molded body, thereby, the top end surface of the engaging element can be formed to be flat. Further, since lubricant is contained in the synthetic resin of the primary molded body in a predetermined ratio, frictional resistance generated when the secondary molding roller contacts the primary molded body can be reduced. Thereby, the hanging portion which hangs down obliquely downward toward the base portion can be stably formed on at least a part of the engaging portion provided on the engaging element. As a result, the molded surface fastener of the present invention described above can be manufactured smoothly.

BRIEF DESCRIPTION OF THE DRAWINGS

FIG. 6 is a front view of an engaging element of a molded surface fastener according to a second embodiment of the present invention when viewed from a front and rear direction.

MODES FOR CARRYING OUT THE INVENTION

Hereinafter, modes for carrying out the invention preferably will be described in detail with reference to the drawings. It should be noted that the present invention is not limited to the embodiments explained as below, and various changes can be made as long as having a substantially same structure and similar functional effects. In each of the following examples, for example, the number, the size, the arrangement position, the forming density, and the like of the engaging element provided in the molded surface fastener are not particularly limited, and can be changed arbitrarily.

First Embodiment

Figure 1:
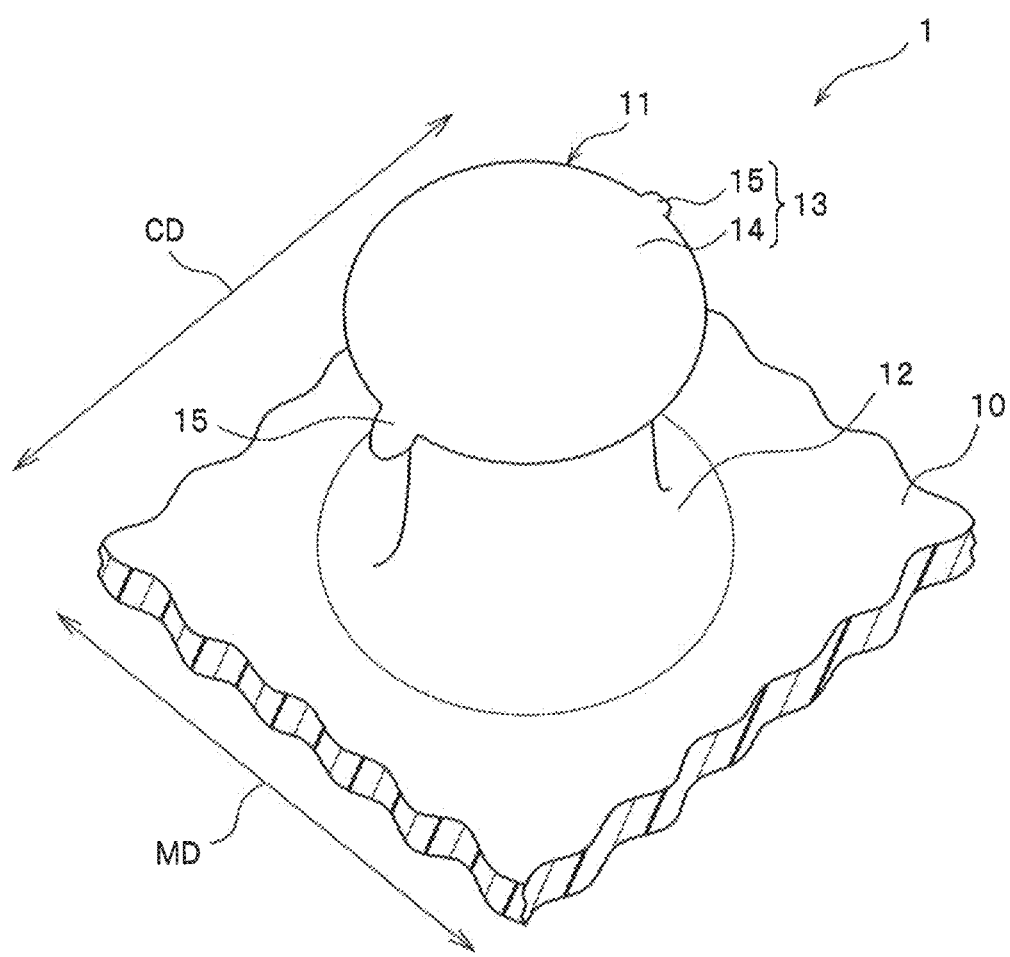
FIG. 1 is a perspective view illustrating a main part of a molded surface fastener according to a first embodiment of the present invention.
Figure 2:
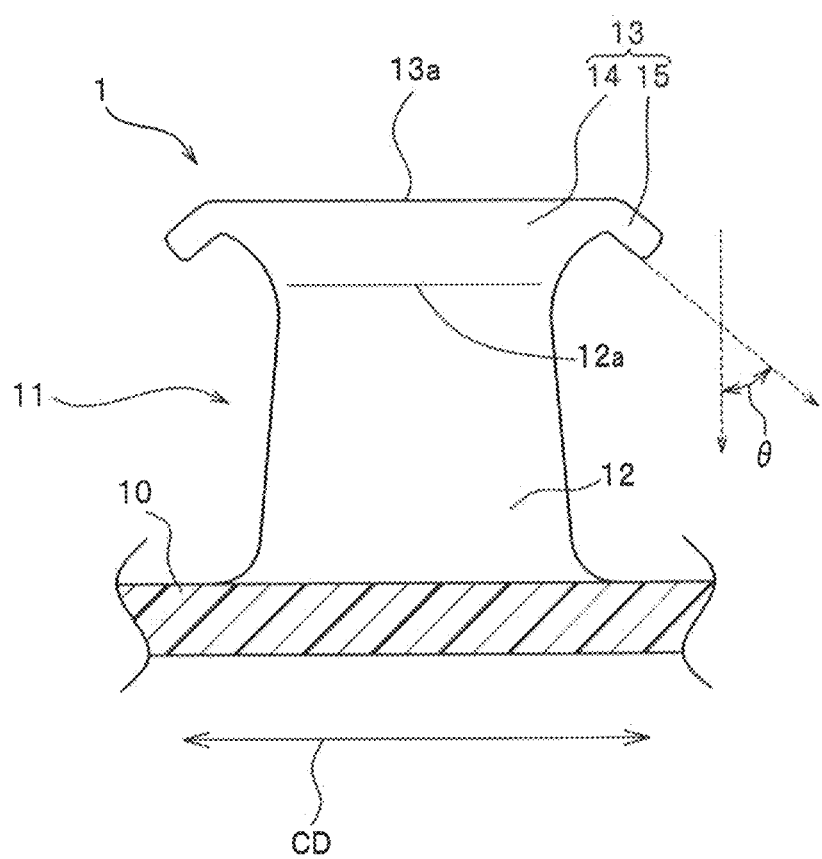
FIG. 2 is a front view of an engaging element of the molded surface fastener shown in FIG. 1 when viewed from a front and rear direction.

FIG. 1 is a perspective view illustrating a main part of a molded surface fastener according to a first embodiment, and FIG. 2 is a front view of an engaging element of the molded surface fastener when viewed from a front and rear direction.

In the following explanation, a front and rear direction regarding a molded surface fastener and a primary molded body is defined as a length direction of the molded surface fastener and the primary molded body to be molded long as described later, and as a direction along a machine direction (M direction or MD) through which the molded surface fastener or the primary molded body flows in a manufacturing step of the molded surface fastener.

A right and left direction is a width direction perpendicular to a length direction and along an upper surface (or lower surface) of the base portion of the molded surface fastener. In this case, the right and left direction and the width direction can also be defined as a cross direction (C direction or CD) perpendicular to the machine direction (MD). An upper and lower direction (thickness direction) is a height direction perpendicular to a length direction and perpendicular to the upper surface (or lower surface) of the base portion of the molded surface fastener.

The molded surface fastener 1 of the first embodiment shown in FIG. 1 is manufactured in a rectangular sheet shape to be long in the machine direction (MD) of a manufacturing apparatus 30 in a plan view by molding with thermoplastic resin using a manufacturing apparatus 30 having a molding apparatus 31 and a pressing apparatus 36 as described later. A length dimension (dimension in the length direction) and a width dimension (dimension in the width direction) of the molded surface fastener 1 in the present invention are not particularly limited.

The molded surface fastener 1 may have a shape other than a rectangle in a plan view.

The molded surface fastener 1 in the first embodiment is formed of synthetic resin containing polypropylene as a main component and lubricant at a ratio of 0.15 wt % or more and 1.00 wt % or less.

More specifically, in the first embodiment, the synthetic resin forming the molded surface fastener 1 contains polypropylene at a ratio of 90 wt % or more, and preferably 95 wt % or more. Thus, polypropylene is contained as a main component (main agent) in the material of the molded surface fastener 1 thereby, an engaging element 11 of the molded surface fastener 1, as described later, can be easily molded in a predetermined shape that the hanging portion is formed in the engaging portion 13. Moreover, since the specific gravity of polypropylene is small, weight reduction of the molded surface fastener 1 can be achieved.

Furthermore, the synthetic resin of the first embodiment contains fatty acid amide lubricant as lubricant. As the fatty acid amide lubricant, for example, stearamide, oleamide, erucamide, methylenebis stearamide, and ethylenebis stearamide are preferably used. These fatty acid amides may be used with only one kind or may be used in combination.

Since such fatty acid amide lubricant is contained in the synthetic resin of the molded surface fastener 1 at 0.15 wt % or more, friction inside the synthetic resin and friction between the apparatus or the machine and the molded body at the time of molding can be reduced. Thus, an upper end part of a primary element 17 is pressed with a secondary molding roller 37a at a predetermined heating temperature in a secondary molding step, as described later, thereby, a hanging pawl portion 15 can be stably formed on an engaging portion 13 of an engaging element 11. On the other hand, since the fatty acid amide lubricant is contained at 1.00 wt % or less, morphological stability at the time of molding can be ensured, and the engaging element 11 having a predetermined shape can be stably formed. Moreover, strength of the molded surface fastener 1 can be ensured appropriately.

In the present invention, the synthetic resin forming the molded surface fastener 1 may contain thermoplastic resin such as polyester, nylon, polybutylene terephthalate, or copolymer thereof as a main component instead of the above-described polypropylene. Furthermore, it is also possible to use fatty acid amide lubricant other than the above-mentioned fatty acid amide as lubricant, or to use lubricant other than the fatty acid amide such as hydrocarbon lubricants, higher alcohol lubricants, metal soap lubricants, and ester lubricants. Further, the synthetic resin of the molded surface fastener 1 may further contain an inorganic substance such as titanium oxide, or an additive other than the lubricant, etc.

The molded surface fastener 1 of the first embodiment has a thin plate-shaped base portion 10 and a plurality of engaging elements 11 standing on an upper surface of the base portion 10. The base portion 10 is formed to have a predetermined thickness, and the upper surface (first surface) and a lower surface (second surface) are formed to be flat and parallel to each other.

The plurality of engaging elements 11 are disposed to be aligned along the machine direction (MD) and a cross direction (CD) of the molded surface fastener 1. In the present invention, arrangement of the engaging elements 11 is not limited as described above. The plurality of engaging elements 11 may be disposed in other arrangement patterns such as zig-zag pattern, for example, or may be disposed in a random manner.

Each engaging element 11 has a stem portion 12 standing on the base portion 10 and an engaging portion 13 (also referred to as an engaging head portion) formed integrally with an upper end part of the stem portion 12 and extending in a direction perpendicular to a height direction. The stem portion 12 has a truncated cone shape such that a cross-sectional area perpendicular to an upper and lower direction gradually increases as it approaches the base portion 10. In the present invention, the shape of the stem portion is not limited to the truncated cone shape.

The engaging portion 13 of the engaging element 11 has an engaging portion main body 14 (also referred to as a head portion main body) having a disk shape or dish shape bulging outward from an entire periphery of an upper end part outer peripheral edge of the stem portion 12, and two micro pawl portions 15 protruded on an outer peripheral side surface of the engaging portion main body 14.

The engaging portion main body 14 extends outward from a position of the upper end part outer peripheral edge in the stem portion 12 (or a boundary portion 12a between the stem portion 12 and the engaging portion 13), and has a circular shape in a plan view when the engaging element 11 is viewed from an upper side. Further, the engaging portion main body 14 is provided with a top end surface (upper surface) 13a which is disposed in parallel with the upper surface of the base portion 10, and is formed to be flat. The top end surface 13a is formed by pressing the upper end part of the primary element 17 with the secondary molding roller 37a in the secondary molding step, as described later. Since the top end surface 13a as above is formed to be in parallel with the upper surface of the base portion 10 and to be flat, the touch on the upper surface side of the molded surface fastener 1 can be improved.

On the opposite side of the top end surface 13a in the engaging portion main body 14, a back surface of the engaging portion 13 is disposed to face the base portion 10. A back surface of the engaging portion main body 14 is formed to extend so as to curve from the upper end part outer peripheral edge of the stem portion 12 toward an outer peripheral edge part of the engaging portion main body 14. Further, an outer peripheral side surface in a curved surface shape is disposed from an outer peripheral part of the top end surface 13a in the engaging portion main body 14 to the back surface of the engaging portion main body 14.

Each engaging element 11 has a right and left pair of pawl portions 15 protruded outward from the outer peripheral side surface of the engaging portion main body 14. Particularly in the first embodiment, the two pawl portions 15 are disposed in a point-symmetrical positional relation with each other in a plan view of the engaging element 11 and are protruded from the outer peripheral side surface of the engaging portion main body 14 in opposite directions along a right and left direction (C direction).

The right and left pawl portions 15 have a shape to hang down obliquely downward so as to approach the base portion 10 from a base end part which is connected to the engaging portion main body 14 toward a tip end part in a protruding direction, as shown in FIG. 2. Each pawl portion 15 is formed as a hanging portion of the engaging portion 13 in the present invention. In the first embodiment, in addition to the pawl portion 15 as in the first embodiment, the hanging portion of the engaging portion 13 may be formed such that a part of the outer peripheral edge part of the engaging portion main body 14 also hang down obliquely downward.

The pawl portion 15 is formed in a micro size such that a pawl width dimension (distance between pawl side wall surfaces) at the base end part of the pawl portion 15 is ⅓ or smaller, preferably ⅕ or smaller, and further preferably ⅐ or smaller of a dimension of the stem portion 12 at the upper end part outer peripheral edge in M direction (MD).

Further, the pawl portion (hanging portion) 15 of the engaging portion 13 is formed to have an inclination angle (pawl protrusion angle) $\theta$ to hang down obliquely downward with respect to a height direction (upper and lower direction) of the stem portion 12 at 20° or larger and 80° or smaller, as shown in FIG. 2.

Here, the inclination angle (pawl protrusion angle) $\theta$ of the pawl portion 15 is defined as an angle at which a lower surface (back surface) or an upper surface (outer surface) of the pawl portion 15 is sloped with respect to the height direction, and preferably as an angle at which the lower surface of the pawl portion 15 is sloped with respect to a downward direction, when the engaging element 11 is viewed from a direction parallel to the upper surface of the base portion 10 (a direction perpendicular to the height direction of the engaging element 11), for example. In a case that the lower surface or the upper surface of the pawl portion 15 is formed into a curved surface, for example, the inclination angle $\theta$ of the pawl portion 15 is defined as an angle at which an imaginary straight line connecting the lower surface (or upper surface) at the base end part and the lower surface (or upper surface) at the tip end part of the pawl portion 15 with the shortest distance is sloped with respect to the downward direction.

Since the inclination angle $\theta$ described above is 20° or larger, when the loop member is engaged with the molded surface fastener 1, loops of a loop member can be easily hooked and locked under the pawl portion 15. On the other hand, since the inclination angle θ is 80° or smaller, the loops engaged with the engaging element 11 can be prevented from coming off from the pawl portion 15.

Next, a manufacturing method of the molded surface fastener 1 of the first embodiment will be described.

Figure 3:
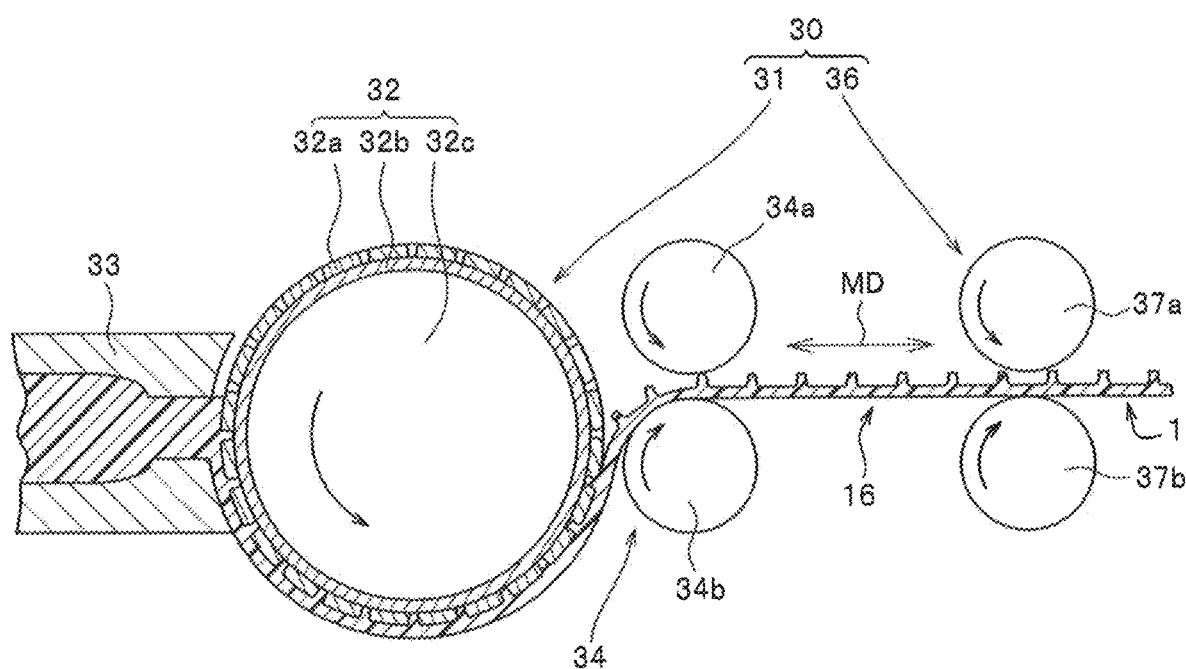
FIG. 3 is a schematic view schematically illustrating an apparatus for manufacturing the molded surface fastener shown in FIG. 1.

The molded surface fastener 1 is manufactured using a manufacturing apparatus 30 as shown in FIG. 3. The manufacturing apparatus 30 has a molding apparatus 31 for conducting a primary molding step and a pressing apparatus 36 for conducting a secondary molding step of pressing and molding a primary molded body 16 molded in the primary molding step.

The molding apparatus 31 has a die wheel 32 rotating in one direction (counterclockwise direction in the drawings), an extrusion nozzle 33 which is disposed to face an outer peripheral surface of the die wheel 32 and discharges a composition (synthetic resin material) in a molten state, as described later, and a pick-up roller 34 disposed on a downstream side of the extrusion nozzle 33 in a rotation direction of the die wheel 32.

The die wheel 32 is formed in substantially the same manner as the die wheel described in Patent Document 1 as above. Briefly, the die wheel 32 has an outer side cylindrical body (outer side sleeve) 32a in a cylindrical shape serving as a mold, an inner side cylindrical body (inner side sleeve) 32b in a cylindrical shape disposed in close contact with an inside of the outer side cylindrical body 32a, and a driving portion 32c for rotating the outer side and inner side cylindrical bodies 32a, 32b.

Figure 4:
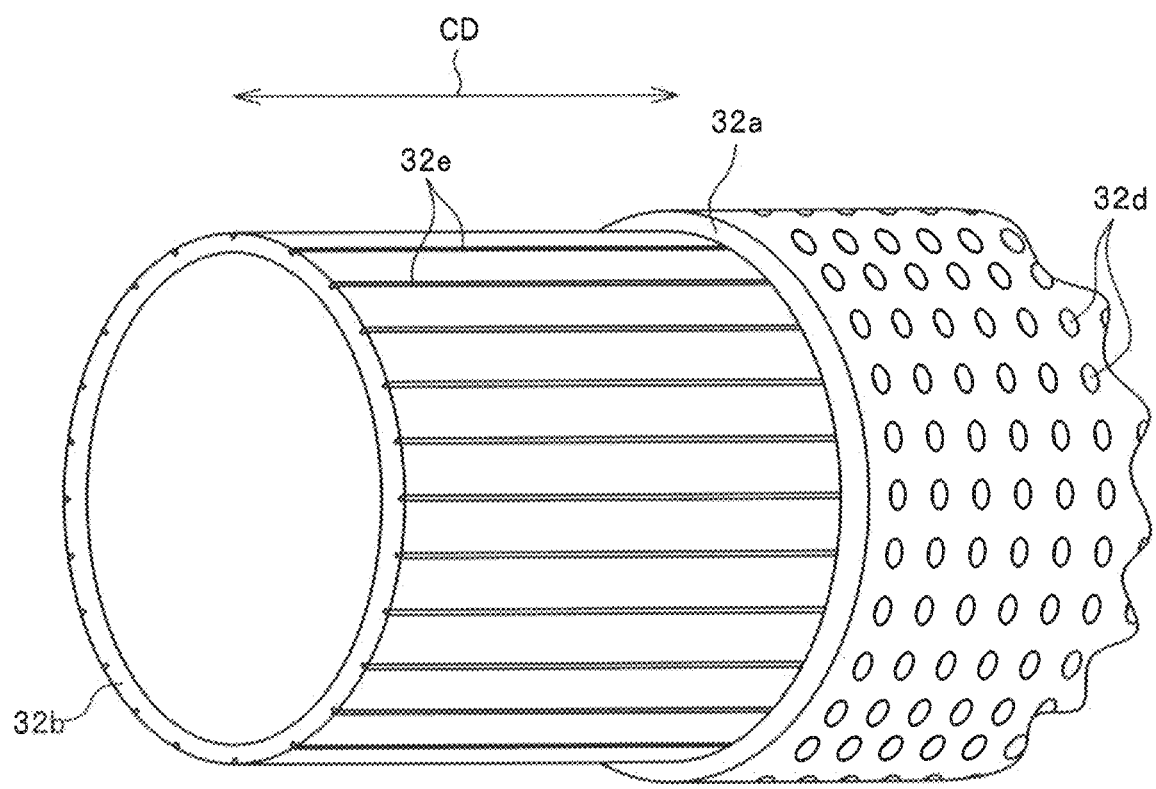
FIG. 4 is a perspective view schematically illustrating an outer side cylindrical body and an inner side cylindrical body of the molding apparatus shown in FIG. 3.

As shown in FIG. 4, the outer side cylindrical body 32a is provided with a plurality of penetration holes 32d penetrating from an outer peripheral surface to an inner peripheral surface of the outer side cylindrical body 32a as a cavity for molding a primary stem portion 17a of the primary molded body 16 as described later. On an outer peripheral surface of the inner side cylindrical body 32b, a plurality of grooved channel portions 32e are grooved along the C direction (CD) parallel to a central axis of a cylinder of the inner side cylindrical body 32b. The grooved channel portion 32e has a groove width and a groove depth through which a molten composition can flow, and is disposed so as to overlap the diameter of the penetration hole 32d formed on the outer side cylindrical body 32a.

Figure 5:
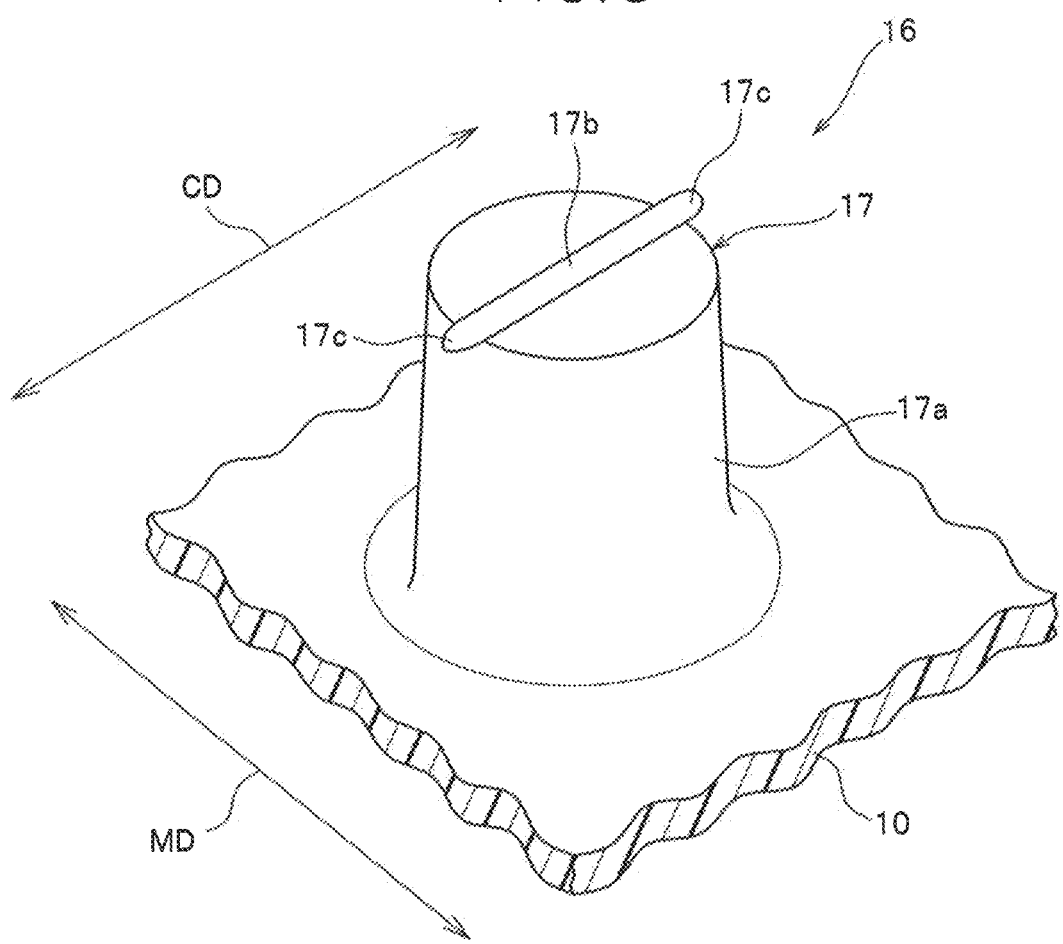
FIG. 5 is a perspective view illustrating a main part of a primary molded body obtained by the molding apparatus.

Since the penetration hole 32d of the outer side cylindrical body 32a and the grooved channel portion 32e of the inner side cylindrical body 32b are provided in the above-described positional relation, when the primary molded body 16 is molded, a plurality of primary elements 17, as shown in FIG. 5, can be formed stably and integrally with the base portion 10, as described later.

The pick-up roller 34 has a pair of upper side holding roller 34a and a lower side holding roller 34b holding the primary molded body 16 molded on an outer peripheral surface part of the die wheel 32 from above and below. The upper side and lower side holding rollers 34a, 34b are disposed to be rotatable in a predetermined direction at a predetermined speed. Further, on outer peripheral surface parts of the upper side and lower side holding rollers 34a,34b, a surface layer (not shown) made of elastomer such as polyurethane elastomer is provided.

The pressing apparatus 36 has an upper and lower pair of secondary molding rollers 37a, 37b disposed on a downstream side of the pick-up roller 34. In this case, a distance between the upper and lower secondary molding rollers 37a, 37b can be adjusted by a height adjusting means (not shown). The upper side secondary molding roller 37a is a pressing roller for molding by pressing the primary element 17 of the primary molded body 16 which is molded in the primary molding step from above. The upper side secondary molding roller 37a is provided with a heating source (not shown) inside, and the surface temperature of the roller is set to a temperature at which the composition can be softened. The lower side secondary molding roller 37b is a support roller to support the primary molded body 16 from below.

In a case that the molded surface fastener 1 is manufactured using the manufacturing apparatus 30 as described above, first, a composition that fatty acid amide lubricant is added to polypropylene as a main component at a ratio of 0.15 wt % or more and 1.00 wt % or less is prepared. Then, the prepared composition is melted and continuously poured from the extrusion nozzle 33 to the outer peripheral surface of the die wheel 32. For example, solid polypropylene and pellets (masterbatch) containing a polypropylene and lubricant are mixed and melt-kneaded. The obtained molten composition is fed from the extrusion nozzle 33 to be supplied to the die wheel 32. The pellet may contain other additives such as titanium oxide.

Thereby, the base portion 10 is continuously molded between the extrusion nozzle 33 and the die wheel 32. At the same time, a plurality of primary elements (provisional elements) 17 as shown in FIG. 5 are integrally molded on the base portion 10 by the outer side cylindrical body 32a and the inner side cylindrical body 32b of the die wheel 32. The primary molded body 16 is thus formed. In this case, the base portion 10 of the primary molded body 16 becomes the base portion 10 of the molded surface fastener 1 as it is. The primary element 17 becomes the engaging element 11 of the molded surface fastener 1 by being press-molded in the secondary molding step.

Each primary element 17 has a truncated cone-shaped primary stem portion 17a standing on the base portion, a thin and long rib portion 17b bulging upward from an upper surface (top end surface) of the primary stem portion 17a, and right and left protruded portions (provisional pawl portions) 17c formed integrally and continuously with the rib portion 17b and protruded from the rib portion 17b to an outside of the primary stem portion 17a. In this case, the rib portion 17b and the protruded portions 17c are molded by the composition melted in the primary molding step from the penetration holes 32d of the outer side cylindrical body 32a flowing into the grooved channel portions 32e provided in the inner side cylindrical body 32b, and therefore formed along the C direction (CD).

Such a primary molded body 16 is cured by half-rotating with the die wheel 32 and then continuously peeled off from the outer peripheral surface part of the die wheel 32 by the pick-up roller 34.

Next, the primary molded body 16 peeled off from the die wheel 32 is conveyed to the pressing apparatus 36 for conducting the secondary molding process.

In the secondary molding step, the primary molded body 16 is introduced between an upper side secondary molding roller 37a and a lower side secondary molding roller 37b of the pressing apparatus 36. At this time, the primary element 17 of the primary molded body 16 is contacted directly to the rotating upper side secondary molding roller 37a, thereby at least an upper end part of the primary element 17 is heated at a predetermined temperature to be softened, and is pressed from above to deform the upper end part of the primary element 17. In the first embodiment, particularly, the rib portion 17b, the right and left protruded portions 17c in the primary element 17 and a part (upper end part) of the primary stem portion 17a are deformed by the upper side secondary molding roller 37a.

Thereby, an engaging portion main body 14 having a top end surface 13a which is flattened by the outer peripheral surface of the upper side secondary molding roller 37a is molded, and the right and left pawl portions (hanging portions) 15 which is protruded in the C direction from an outer peripheral side surface of the engaging portion main body 14 and hanging down obliquely downward are molded. Thus, the molded surface fastener 1 of the first embodiment shown in FIG. 1 is manufactured.

In the molded surface fastener 1 of the first embodiment manufactured as above, the top end surface 13a of the engaging portion 13 (i.e., the top end surface 13a of the engaging portion main body 14) is formed with the upper side secondary molding roller 37a as a flat surface parallel to the upper surface of the base portion 10 as described above. As a result, the upper surface of the molded surface fastener 1 can be formed so as to obtain good touch.

Furthermore, in the first embodiment, the molded surface fastener 1 is molded using thermoplastic resin containing polypropylene as a main component and a predetermined ratio of fatty acid amide lubricant. By adding such lubricant, a surface of the primary molded body 16 molded in the primary molding step can be formed to be slippery, and friction with the upper side secondary molding roller 37a of the pressing apparatus 36 can be reduced, for example. Moreover, friction between the synthetic resin particles in the molded body can be reduced. Therefore, by conducting a press molding to the primary element 17 with the upper side secondary molding roller 37a as described above, the pawl portion 15 protruded from the outer peripheral side surface of the engaging portion main body 14 can be formed smoothly and stably in a form of the hanging portion to hang down obliquely downward so that the tip end part approaches the base portion 10.

Further, the two pawl portions 15 protruded obliquely downward as above are provided in the engaging portion 13 of the engaging element 11, thereby, when the loop member is engaged with the molded surface fastener 1, the loops of the loop member can be less likely to be disengaged from the engaging element 11. Therefore, engaging strength (peeling strength) of the molded surface fastener 1 with respect to the loop member can be effectively enhanced.

In the first embodiment as described above, the primary molded body 16 molded by the outer peripheral surface part of the die wheel 32 is peeled off from the die wheel 32 with the pick-up roller 34, thereafter, the primary molded body 16 is introduced between the upper side secondary molding roller 37a and the lower side secondary molded roller 37b to conduct a press molding (secondary molding) with respect to the primary molded body 16. In the present invention, however, by providing a heating means and the like on the upper side holding roller of the pick-up roller, for example, the primary molded body is peeled off from the die wheel with the upper side holding roller and the lower side holding roller, and at the same time a press molding (secondary molding) can be conducted with respect to the primary molded body immediately after being peeled off. In this case, the molded surface fastener 1 can be manufactured without using the above-described pressing apparatus 36.

In the first embodiment, the hanging portion provided on the engaging portion 13 of the engaging element 11 is formed as the pawl portion 15. In the present invention, however, the hanging portion of the engaging portion may be continuously formed of both the pawl portion and the engaging portion main body of the engaging portion, or may be formed only of the engaging portion main body of the engaging portion. Furthermore, when the hanging portion is formed only of the engaging portion main body of the engaging portion, the engaging element can be formed without the pawl portion provided on the engaging portion.

Second Embodiment

Next, a molded surface fastener according to the second embodiment will be described with reference to FIG. 6. FIG. 6 is a front view of an engaging element of the molded surface fastener when viewed from a front and rear direction.

The molded surface fastener 2 in the second embodiment has a thin plate-shaped base portion 10 and a plurality of engaging elements 21 standing on an upper surface of the base portion 10. According to the molded surface fastener 2 in the second embodiment, although the shape of the engaging element 21 is different from that of the molded surface fastener 1 in the first embodiment described above, other configurations (structure, properties, etc.) including the shape of the base portion 10 and the material of the molded surface fastener 2 are the same. Therefore, in the second embodiment, parts or members substantially the same as those of the first embodiment described above are denoted by the same reference signs, and detailed description thereof is omitted.

The engaging element 21 of the second embodiment has a truncated cone-shaped stem portion 22 standing on the base portion 10 and two micro pawl portions 25 which are formed integrally with an upper end part of the stem portion 22 and are protruded to a right and left from an outer peripheral side surface of the stem portion 22.

A top end surface (upper surface) 22a of the stem portion 22 is formed as a top end surface of the engaging element 21 to be flat and in parallel with an upper surface of the base portion 10. Further, an engaging portion 23 of the engaging element 21 is formed as the two pawl portions 25 extending to an outside of an upper end part outer peripheral edge of the stem portion 22 (i.e., an outer peripheral edge of the top end surface 22a of the stem portion 22). These two pawl portions 25 are protruded from an outer peripheral side surface of the stem portion 22 in opposite directions along the right and left direction (C direction).

The right and left pawl portions 25 are formed in a shape to hang down obliquely downward from the base end part toward a tip end part in a protruding direction so as to approach the base portion 10 as a hanging portion of the engaging portion 23. In this case, each pawl portion 25 is formed such that an inclination angle (pawl protrusion angle) θ with respect to a downward direction of the height direction of the stem portion 22 is 20° or larger and 80° or smaller.

The molded surface fastener 2 of the second embodiment as described above is manufactured using the manufacturing apparatus 30 shown in FIG. 3 as in the case of the first embodiment.

First, as in the case of the first embodiment, a predetermined composition is prepared, the composition is melted and poured onto the outer peripheral surface of the die wheel 32 from the extrusion nozzle 33 to conduct a primary molding step. Thereby, a primary molded body 16 shown in FIG. 5 is molded.

Subsequently, the obtained primary molded body 16 is conveyed to a pressing apparatus 36 for conducting a secondary molding step. In the secondary molding step in the second embodiment, a rib portion 17b and right and left protruded portions 17c of a primary element 17 are contacted with an upper side secondary molding roller 37a to be deformed. In other words, in the second embodiment, the secondary molding step is conducted so that a primary stem portion 17a is not deformed or less deformed by the upper side secondary molding roller 37a.

As a result, the above-described stem portion 22 is molded from the primary stem portion 17a and a part of the rib portion 17b of the primary element 17, and the above-described right and left pawl portions (hanging portions) 25 are molded from the rest part of the rib portion 17b and the right and left protruded portions 17c. Thereby, the molded surface fastener 2 having an engaging element 21 as shown in FIG. 6 is manufactured.

Also, in the molded surface fastener 2 of the second embodiment manufactured as above, the same effects as those of the molded surface fastener 1 of the first embodiment can be obtained.

In the first and the second embodiments, the case when the two pawl portions 15, 25 are provided on each engaging element 11, 21 is explained. In the present invention, however, the number of the pawl portions provided on the engaging element is not limited, and each engaging element can be formed to have one pawl portion, or three or more pawl portions. Furthermore, in the present invention, it is also possible that the number of the pawl portions provided on each engaging element is changed in the machine direction (MD), for example, to manufacture a molded surface fastener, or that the pawl portions are not formed in some engaging elements to manufacture a molded surface fastener.

EXAMPLES

Hereinafter, the present invention will be described more specifically with reference to examples.

Examples 1 to 3, Comparative Examples 1 and 2

As a molded surface fastener according to Examples 1 to 3, a molded surface fastener having an engaging element 11 as shown in FIGS. 1 and 2 was manufactured using a composition having components as shown in Table 1 as below by a manufacturing method as described in the first embodiment. In Examples 1 to 3, polypropylene and fatty acid amide lubricant were used for synthetic resin and lubricant as the main component contained in the molded surface fastener. In this case, the polypropylene (main agent) can contain an inorganic substance such as titanium oxide at a ratio of 2.0 wt % or less.

For comparison, a molded surface fastener according to Comparative Example 1 and Comparative Example 2, as shown in Table 1 below, was manufactured using a composition containing lubricant at less than 0.15 wt %, or a composition not containing lubricant by the manufacturing method described in the first embodiment.

Further, the inclination angle θ (see FIG. 2) of the pawl portion of each engaging element was measured for each of the manufactured molded surface fasteners of Examples 1 to 3 and Comparative Examples 1 and 2. In this case, the measurement of the inclination angle θ of the pawl portion was conducted on five engaging elements randomly selected for each molded surface fastener, and the average value of the measured inclination angles θ was calculated and used as a measurement result.

Table 1 as below shows the composition ratios of the compositions used in Examples 1 to 3 and Comparative Examples 1 and 2 and the measurement results of the inclination angle θ of each molded surface fastener.

TABLE 1

| Sample | composition ratio (wt %) | | Inclination angle θ of pawl portion (degree) |
|---|---|---|---|
| | Polypropylene | lubricant | |
| Example 1 | 99.7 | 0.3 | 30 |
| Example 2 | 99.5 | 0.5 | 30 |
| Example 3 | 99.3 | 0.7 | 30 |
| Comparative Example 1 | 99.9 | 0.1 | 100 |
| Comparative Example 2 | 100 | 0 | 100 |

In each of the molded surface fasteners of Examples 1 to 3 and Comparative Examples 1 and 2, it was confirmed that the top end surface of the engaging portion in the engaging element is formed to be flat and in parallel with the upper surface of the base portion.

In the molded surface fasteners of Examples 1 to 3 manufactured by the compositions containing fatty acid amide lubricant at a ratio of 0.15 wt % or more and 1.00 wt % or less, it was confirmed that the right and left pawl portions are protruded obliquely downward from an outer peripheral side surface of the engaging portion main body, and the inclination angle θ of the pawl portion is 30° as shown in Table 1 as above. On the other hand, in the molded surface fasteners of Comparative Examples 1 and 2, it was confirmed that the inclination angle θ of the pawl portion is 100°, and the pawl portion is protruded obliquely upward from the outer peripheral surface of the engaging portion main body.

REFERENCE SIGNS 1,2 Molded surface fastener
10 Base portion
11 Engaging element
12 Stem portion
12a Boundary portion
13 Engaging portion
13a Top end surface (Upper surface)
14 Engaging portion main body
15 Pawl portion (Hanging portion)
16 Primary molded body
17 Primary element (Provisional element)
17a Primary stem portion
17b Rib portion
17c Protruded portion (Provisional pawl portion)
21 Engaging element
22 Stem portion
22a Top end surface (Upper surface)
23 Engaging portion
25 Pawl portion (Hanging portion)
30 Manufacturing apparatus
31 Molding apparatus
32 Die wheel
32a Outer side cylindrical body (Outer side sleeve)
32b Inner side cylindrical body (Inner side sleeve)
32c Driving roller
32d Penetration hole
32e Grooved channel portion
33 Extrusion nozzle
34 Pick-up roller
34a Upper side holding roller
34b Lower side holding roller 36 Pressing apparatus
37a,37b Secondary molding roller (Calender roller)
θ Inclination angle (Pawl protrusion angle)

The invention claimed is:

1. A molded surface fastener which is made of synthetic resin and including a base portion and a plurality of engaging elements standing on the base portion, wherein each of the engaging elements comprises a stem portion standing on the base portion and an engaging portion which is formed integrally with an upper end part of the stem portion and includes a part extending to an outside of an upper end part outer peripheral edge of the stem portion in a plan view of the engaging element, wherein
the synthetic resin contains lubricant at 0.15 wt % or more and 1.00 wt % or less,
a top end surface of the engaging element is formed to be flat, and
the engaging portion has a hanging portion which hangs down obliquely downward toward the base portion.

2. The molded surface fastener according to claim 1, wherein
the engaging portion includes an engaging portion main body having a shape to extend outward from an entire upper end part outer peripheral edge of the stem portion and at least one pawl portion protruded from an outer peripheral edge part of the engaging portion main body,
the top end surface of the engaging element is a top end surface of the engaging portion main body, and
the hanging portion includes the pawl portion.

3. The molded surface fastener according to claim 1, wherein
the engaging portion includes at least one pawl portion protruded from an outer peripheral side surface of the stem portion,
a top end surface of the stem portion is formed to be flat as the top end surface of the engaging element, and
the hanging portion is provided on at least a part of the pawl portion.

4. The molded surface fastener according to claim 1, wherein the lubricant is fatty acid amide lubricant.

5. The molded surface fastener according to claim 1, wherein the main component of the synthetic resin is polypropylene.

6. The molded surface fastener according to claim 1, wherein an inclination angle at which the hanging portion hangs down with respect to a height direction of the stem portion is 20° or larger and 80° or smaller.

7. The molded surface fastener according to claim 2, wherein the lubricant is fatty acid amide lubricant.

8. The molded surface fastener according to claim 3, wherein the lubricant is fatty acid amide lubricant.

9. The molded surface fastener according to claim 2, wherein the main component of the synthetic resin is polypropylene.

10. The molded surface fastener according to claim 3, wherein the main component of the synthetic resin is polypropylene.

11. The molded surface fastener according to claim 2, wherein an inclination angle at which the hanging portion hangs down with respect to a height direction of the stem portion is 20° or larger and 80° or smaller.

12. The molded surface fastener according to claim 3, wherein an inclination angle at which the hanging portion hangs down with respect to a height direction of the stem portion is 20° or larger and 80° or smaller.

13. A manufacturing method of a molded surface fastener made of synthetic resin and including a base portion and a plurality of engaging elements standing on the base portion, wherein each of the engaging elements comprises a stem portion standing on the base portion and an engaging portion which is formed integrally with an upper end part of the stem portion and includes a part to extend to an outside of an upper end part outer peripheral edge of the stem portion in a plan view of the engaging element, wherein
the method including:
a preliminary step of preparing a composition that lubricant at 0.15 wt % or more and 1.00 wt % or less is added to a thermoplastic resin;
a primary molding step of melting the composition and molding a primary molded body having the base portion and a plurality of primary elements standing on the base portion; and
a secondary molding step of molding the molded surface fastener in which a top end surface of the engaging element is formed to be flat and the engaging portion has a hanging portion which hangs down obliquely downward toward the base portion by contacting a secondary molding roller with an upper end part of the primary element molded in the primary molding step.

* * * * *

UNITED STATES PATENT AND TRADEMARK OFFICE
CERTIFICATE OF CORRECTION

PATENT NO. : 11,559,114 B2
APPLICATION NO. : 16/828460
DATED : January 24, 2023
INVENTOR(S) : Makoto Takekawa et al.

Page 1 of 1

It is certified that error appears in the above-identified patent and that said Letters Patent is hereby corrected as shown below:

In the Specification

In Column 1, Line 34, delete "far;" and insert -- far, --.

In Column 1, Line 36, delete "2017/10990" and insert -- 2017/109902 --.

In Column 3, Line 67, delete "parrarel" and insert -- parallel --.

In Column 6, Line 50, delete "1" and insert -- 1, --.

Signed and Sealed this
Eighteenth Day of April, 2023

Katherine Kelly Vidal
*Director of the United States Patent and Trademark Office*